(12) United States Patent
Hickey et al.

(10) Patent No.: US 8,945,392 B2
(45) Date of Patent: Feb. 3, 2015

(54) COMPOSITE FOR PHOSPHATE AND AMMONIUM ION REMOVAL

(71) Applicant: Red Lion Chem Tech, LLC, San Diego, CA (US)

(72) Inventors: Michael E. Hickey, Escondido, CA (US); Allan D. Pronovost, San Diego, CA (US)

(73) Assignee: Red Lion Chem Tech, LLC, San Diego, CA (US)

( * ) Notice: Subject to any disclaimer, the term of this patent is extended or adjusted under 35 U.S.C. 154(b) by 0 days.

(21) Appl. No.: 13/781,290

(22) Filed: Feb. 28, 2013

(65) Prior Publication Data

US 2014/0076013 A1    Mar. 20, 2014

Related U.S. Application Data

(60) Provisional application No. 61/703,186, filed on Sep. 19, 2012.

(51) Int. Cl.
| | |
|---|---|
| C01B 39/02 | (2006.01) |
| C02F 1/42 | (2006.01) |
| C05B 17/00 | (2006.01) |
| C05C 3/00 | (2006.01) |
| B01J 43/00 | (2006.01) |
| B01J 20/18 | (2006.01) |
| C02F 1/28 | (2006.01) |
| C02F 101/10 | (2006.01) |
| C02F 101/16 | (2006.01) |
| C02F 103/32 | (2006.01) |

(52) U.S. Cl.
CPC ............... *C05B 17/00* (2013.01); *B01J 43/00* (2013.01); *B01J 20/186* (2013.01); *C02F 1/288* (2013.01); *C02F 1/281* (2013.01); *C02F 2101/105* (2013.01); *C02F 2101/16* (2013.01); *C02F 2103/327* (2013.01)
USPC ............ 210/685; 71/32; 71/33; 71/49; 71/54; 71/61; 210/681; 210/683; 423/700

(58) Field of Classification Search
USPC .......... 423/700; 210/660, 681, 683, 685, 903, 210/906; 71/32, 33, 49, 54, 61
See application file for complete search history.

(56) References Cited

U.S. PATENT DOCUMENTS

| | | | |
|---|---|---|---|
| 5,116,793 A | | 5/1992 | Chao et al. |
| 7,588,744 B1 | * | 9/2009 | Sylvester ...................... 423/299 |
| 8,663,479 B2 | * | 3/2014 | Litz et al. ...................... 210/681 |
| 2003/0132155 A1 | * | 7/2003 | Litz et al. ...................... 210/284 |
| 2004/0192538 A1 | * | 9/2004 | Hamon et al. .................. 502/60 |
| 2008/0035036 A1 | | 2/2008 | Bassani et al. |

(Continued)

FOREIGN PATENT DOCUMENTS

WO    WO-94/08896    4/1994

OTHER PUBLICATIONS

International Search Report and Written Opinion for PCT/US2013/060740, mailed Feb. 4, 2014, 10 pages.

(Continued)

*Primary Examiner* — Wayne Langel
(74) *Attorney, Agent, or Firm* — Morrison & Foerster LLP

(57) ABSTRACT

The invention employs composites of zeolite and ferric oxide hydroxide for removal of inorganic nitrogen and phosphorus wastes from animal environments.

20 Claims, 2 Drawing Sheets

(56) References Cited

U.S. PATENT DOCUMENTS

2010/0111827 A1* 5/2010 Kanazawa ............. 423/700
2010/0243571 A1 9/2010 Semiat et al.

OTHER PUBLICATIONS

Cooney, et al., "Ammonia Removal from Wastewaters Using Natural Australian Zeolite. II. Pilot-Scale Study Using Continuous Packed Column Process," Separation Science & Technology (1999) 34(14):2741-2760.

Gallaher et al., "Estimation of N and P in Florida Dairy Wastewater for Silage Systems," (presented at the 31st Florida Dairy Production Conference in Apr. 1994,) pp. 72-76.

"Soil Facts. Dairy Manure as a Fertilizer Source," North Carolina Cooperative Extension Service, AG-439-28 (1997).

* cited by examiner

COMPOSITE FOR PHOSPHATE AND AMMONIUM ION REMOVAL

CROSS-REFERENCE TO RELATED APPLICATION

This application claims priority from U.S. Ser. No. 61/703,186 filed 19 Sep. 2012. The content of this document is incorporated by reference herein in its entirety.

TECHNICAL FIELD

The invention relates to the field of remediation of agricultural and livestock waste. More specifically it relates to removal of ammonia and phosphate from various depositories and converting these into a form suitable for use as a continuous release fertilizer.

BACKGROUND ART

Environmentally sustainable management of dairies is critical to the economic health of American agriculture. A major upcoming challenge is the planning, implementation, and documentation of nutrient management practices for proposed federal regulations for concentrated animal feeding operations (CAFO, EPA 2008) to control water pollution. The present invention is focused on dairy waste management and on developing improved dairy waste management methods that will help to ensure that impacts on groundwater quality are minimized.

Applying dairy manure and wastewater to agricultural fields has been shown to increase crop yields, improve water holding capacity of the soil and enhance soil fertility, "Estimation of N and P in Florida Dairy Wastewater for Silage Systems"; Gallaher, R. N., et al., Presented at the 31st Florida Dairy Production Conference, Gainesville, Fla., April 1994. However, when manure wastes are applied to fields at high rates over a period of years, nutrients can accumulate causing eutrophication (excessive growth of aquatic plants and subsequent decay caused by increased phosphorus and nitrogen concentrations) in drainage waterways; degradation of drinking water; nutrient toxicities or nutrient deficiencies in plants; disruptions in soil microbial populations; and nutritional imbalances for grazing animals, "Soil Facts. Dairy Manure as a Fertilizer Source" North Carolina Cooperative Extension Service, AG-439-28.

Growers and dairy producers also run the risk of violating state and federal regulations designed to avoid these issues.

Ferric oxide hydroxide (FeO(OH)) is routinely used in aquaria to scavenge phosphate. Formulations of this material are available from Ocean's Blend and other vendors. It is assumed that there is an exchange between hydroxyl groups and inorganic phosphate whereby both soluble and insoluble forms of ferric ion wherein two or more of the plus charges of the three charges characterizing ferric ion are neutralized by phosphate. The resulting solid forms of product are susceptible to bacterial degradation to again release the phosphate, although at a relatively slow rate.

Zeolites (which can be of the class of crystalline compounds known as aluminum silicates, zirconium silicates and the like) and some ceramics have been used to remove ammonium and/or ammonia from wastewaters. See, for example, Cooney, E. L., et al., *Separation Science & Technology* (1999) 34:2741-2760. This, too, has been used extensively in aquaculture.

Zeolites are also known to remove various heavy metals, including ferrous ion ($Fe^{+2}$) from aqueous environments. For example, Lenntech BV (Delft, The Netherlands) lists the capacity of zeolite to be in the range of about 1 mEq/g for $Fe^{+2}$, $Zn^{+2}$, $Ni^{+2}$, $Cd^{+2}$, $Pb^{+2}$, and $Cu^{+2}$ in that order of affinity. In general, this is understood as a cation exchange process for heavy metal binding but it is not heavy metal specific.

There is still a need, however, for an efficient system to remove, both phosphate and ammonia from areas of agricultural waste. For example, the concentrations of these ions permitted in lagoons used to store waste from dairy cows places limits on the number of cows that can be maintained in a herd. Many of these lagoons are quite large, exceeding the area of a football field. An efficient method to convert the phosphate and ammonium ions into forms that can be recovered and used as fertilizer would permit larger herds to be maintained. The present invention provides composites to achieve this end through the production and use of a bifunctional binding zeolite.

DISCLOSURE OF THE INVENTION

The invention relates to a bifunctional amalgam composite of materials that selectively binds either and/or both ammonium and/or phosphate compounds in animal waste lagoon water during treatment to produce a nitrogen and phosphate fertilizer in situ. The waste is thus converted to a form to fertilize crops on a continuous slow-release basis. The bound products provide a means of using more waste materials on the fields since the waste materials are available on a slow continuous-release basis.

The invention composites are amalgams of zeolite and ferric oxide hydroxide that form a bifunctional granular zeolite-ferric composite. The bifunctional zeolite-ferric granular composite is capable, simultaneously, of removing ammonium ion/ammonia and inorganic phosphate from a variety of environments, including dairy lagoons.

Thus, in one aspect, the invention is directed to a bifunctional composite of a zeolite and ferric ion produced through cation exchange of ferric oxide hydroxide with the $Na^+$ (or other cation form) of zeolite. In another aspect, the invention is directed to a method to remove phosphate and ammonia using these bifunctioanl granular composites, and to the resulting slow continuous-release fertilizer product, as well as to methods to fertilize in situ with this fertilizer.

MODES OF CARRYING OUT THE INVENTION

Figure 1:
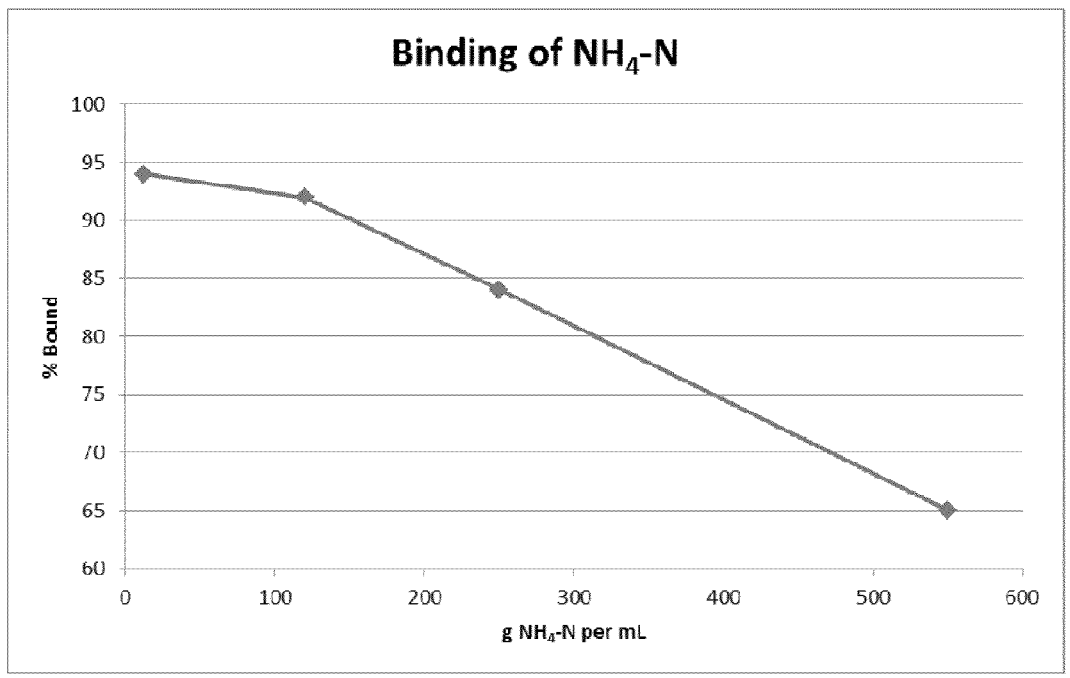
FIG. 1 shows the capacity of the ammonium binding component of the invention composite to bind soil nitrogen.

Existing ammonium binding materials added prior to drainage into waste lagoons have little value to nutrient release in the field because they only address odor through ammonium ($NH_4^+$) removal to reduce ammonia ($NH_3$) production. Current phosphate removal agents require continual flow over the material to work effectively in the pond or lagoon. The bifunctional granular zeolite-ferric composites of the invention also minimize ammonia odors in the field since the bifunctional composite is deposited with the wastewater, hence removing ammonium from the lagoon. The composites of the invention can be added to lagoons and no further action is required. The correct amount is simple to calculate based on sample testing required of lagoon water by regulatory agencies wherein total nitrogen, ammonium, ammonia and phosphate are routinely measured.

The bifunctional zeolite-ferric composites of the invention have a granular size small enough to allow them to disperse readily in wastewater for maximal exposure to soluble species, yet large enough to allow them to settle over time (24-48 hours) through the water column to maximize efficiency; and large enough to allow the granular fertilizer and product to be retained on the surface of soil when applied, for example, post harvest. Aerated and non-aerated lagoons may be used. Application of the final reacted zeolite-ferric composite product (i.e., fertilizer) to fields may be accomplished by 1 of 2 methods: either direct dispersion of wastewater containing microdispersed granular micro particulate zeolite-ferric composite as product and/or concentration of spent reacted zeolite-ferric composite by harvesting of organic matter containing granular microparticulate reacted product using water removal/evaporative techniques in routine use in the farm environment.

The time release characteristic of the product formed from the composite of the invention and the nitrogen/phosphorus wastes eliminates extensive calculation based on animal waste output and volume in the field, and helps prevent eutrophication and contamination of groundwater caused by over application of wastewater fertilizer.

Thus, use of the invention composites provides a means of using more waste materials on the fields thereby increasing the number of animals that can be maintained on a farm.

The invention composites remove waste nitrogen and phosphorus from various environments. "Phosphorus" is typically found in the form of "phosphate," which depending on pH is in the form of $H_3PO_4$, $H_2PO_4^-$, $HPO_4^{-2}$ or $PO_4^{-3}$. "Nitrogen" is typically in the form of ammonium ion or ammonia, again depending on pH. These "nitrogen" and ammonium ion/ammonia and "phosphorus" and phosphate are used interchangeably.

The invention is comprised of a bifunctional ferric-zeolite composite, produced as an amalgam by ion exchange, unique in structure and function, that removes both nitrogen and/or phosphorus wastes. The components of the composite that bind inorganic nitrogen and phosphorus are bound in equilibrium to each other as a single final component, amalgamated material produced by ion exchange during the manufacturing process. This composite is so applied as a single granular bifunctional compound instead of separate reagents for nitrogen or phosphorous. This makes the bifunctional zeolite-ferric material easy to use and eliminates much of the dust associated with other commercial phosphorus or nitrogen single material removal products.

When the bifunctional granular zeolite-ferric composite of the invention is added to lagoon wastewater, the components dissociate in the presence of either ammonium, or phosphate, into the original components. In the presence of phosphate, the phosphate binding material will independently bind phosphate. In the presence of ammonium compounds, the ammonium binding material will independently bind ammonium in the presence of such materials. The bifunctional composite is thus either solo-functional with respect to each component, bifunctional, or proportionally bifunctional depending upon the relative concentration of binding components under in situ conditions, and it is has the inherent ability to flux between functionalities based on direct response to environmental conditions.

There are no current mono-compounded bifunctional products that address both the phosphate and ammonia issues simultaneously either independently or concurrently.

The composites of the invention remove both nitrogen and phosphorus by essentially anion and cation exchange processes both working independently from the same bifunctional granular composite. It is also clear that in order to be effective, the composites must be able to operate at a range of pH's so that inorganic phosphate has an appropriate negative charge and ammonia is in the form of ammonium ion, thus permitting its ion exchange with the bifunctional zeolite-ferric component. The bifunctional composite converts these inorganic materials that were soluble previously in aqueous environments into insoluble granules that can then be removed and subsequently used as fertilizers by virtue of bacterial release of ammonium ion and phosphates back into the soil, but at a rate that is non-contaminating, yet continuous, as needed.

This is effected by a complex equilibrium in which the zeolite-ferric composite behaves as a cation exchanger for ferric ion which, upon reaction with phosphate also provides a more soluble form of ferric phosphate.

Various types of zeolite are available. These include the sodium form of ZK406H (also known as St. Cloud Natural Zeolite) which are natural zeolites with various particle sizes having a microporous arrangement of silica and alumina tetrahedra. ZK406H is a member of the clinoptilolite family and has the capacity specifically to bind ammonium ions upon exchange of the sodium in the zeolite pore with ammonium. Other zeolites include zeolite Y which is available in both powder and liquid forms. Both natural and synthetic zeolites are available.

The sodium ZK406H zeolite cation forms have the following relative binding affinities: Rb>Li>K>Cs>$NH_4^+$>Na>Ca>Ag>Cd>Pb>Zn>Ba>Sr>Ca>Hg>Mg>$Fe^{+3}$>Co>Al>Cr. Relative binding is a function of hydrate molecular size. ("Zeolites and Ordered Mesoporous Materials: Progress and Prospects", edited by J. Cejka and H. van Bekkum, *Studies in Surface Science and Catalysis*, 157, 2005). The sodium ZK406H zeolite thus can bind either $NH_4^+$, $Na^+$, and $Fe^{+3}$ and the sodium form of zeolite can be converted to the $Fe^{+3}$ form of zeolite by cation exchange. The latter is the subject of this invention, i.e. a bifunctional zeolite-ferric composite.

The zeolite has a higher binding affinity for $NH_4^+$ than either $Fe^{+3}$ or sodium ion; and soluble phosphate has a higher affinity for $Fe^{+3}$ than the zeolite ion exchange pore. These relative binding affinities favor the substration of ammonium over ferric cation or sodium in the pore; and sodium over ferric cation for phosphate binding. Hence the bifunctional granular zeolite-ferric composite is appropriate for either or both ammonium and phosphate removal to a form for use as continuous slow release fertilizer.

The solid forms, in the form typically of granules, can be removed from the aqueous environment and used as fertilizers by filtration, settling or other means of separation or may be re-dispersed for direct application to the environment. Suitable environments include, besides dairy lagoons, lagoons that store waste from other animals such as cattle, horses, pigs, chickens and the like, whether or not the lagoon is aerated. The bifunctional composites of the invention are thus applicable to aqueous environments that contain animal waste, including chicken coop, and other livestock areas.

When lagoon wastewater treated by the invention method is spread onto the fields, the components of the composite are carried to the fields by spraying/dispersing along with the bound phosphorus and ammonium. The bifunctional granular admixture composite has a size from −100 mesh to −400 mesh, preferably −200 mesh to −325 mesh. The phosphorus bound to the invention remains in equilibrium with soluble phosphorus. Thus, when phosphorus is removed by plants and concentration of soluble phosphorus is reduced, loosely bound phosphorus is converted to the soluble form to maintain the equilibrium. If no phosphorus is required, the phosphorus remains bound to the components until needed. It is still present in the soil and will be detected by standard soil testing, to allow planning of crop needs for the current and future growth of crops.

The composite binds ammonium ions tightly into the structure of the ammonium binding component present by adsorption, electrostatic charge or surface adherence through ionic bonding or Van Der Waals forces. This form of nitrogen cannot be used by plants but is gradually released by soil microorganisms as ammonium ion ($NH_4^+$). The $NH_4^+$ can be utilized readily by the plants. In warm, well-drained soil, ammonium transforms rapidly to nitrate. Since ammonium ion is a cation, excess ammonium is attracted to and held by the negatively charged soil clay or by the composites of the invention Ammonium ion is available to plants, as required, due to the equilibrium between the invention composite and soil when combined with plant utilization. Like phosphorus, the nitrogen bound to the composite of the invention is still present in the soil and will be detected by standard soil testing for total nitrogen in order to allow planning of crop needs for the current and future growth of crops.

The invention provides a single component, bifunctional granular formulation that results in a continuous slow-release material to produce a nitrogen and phosphate fertilizer in situ resulting in less eutrophication and contamination of groundwater. The composites are environmentally friendly and non-polluting, and totally nontoxic for all animal and plant life, including microscopic and microbial species found in soil. The materials used for phosphorus and ammonia control are Generally Regarded As Safe (GRAS). Their binding capacity is high through selection of high surface area material that chemically bonds phosphorus and ammonium upon contact. The composites are sustainable as they return to the earth through recycling in unaltered form.

The following examples are offered to illustrate but not to limit the invention.

Preparation A

Production of Bifunctional Zeolite-Ferric Composite

An amalgam of zeolite-ferric composite (using ZK406H) was prepared under appropriate aqueous conditions utilizing the sodium form of ZK406H, as granules, and ferric oxide hydroxide through ion exchange. Under aqueous conditions ferric oxide hydroxide (FeO(OH)) was solubilized, followed by cation exchange with sodium zeolite. After settling the resulting amalgam composite exhibited a characteristic spectral shift from approximately 680 to 570 nm. The binding capacity of resultant dried material for nitrogen or phosphorous was calculated as described below.

The amalgamated bifunctional composite was stored until use at room temperature. The material was used either directly as granular powder addition to wastewater or by dispersion of granular powder in water for up to 24 hours before addition to wastewater.

Capacity for Nitrogen Binding: Two (2) grams of the sodium form of zeolite were mixed for 8 hours on a Nutator™ mixer with 15 mL of ammonium chloride ($NH_4Cl$) solutions containing 12, 120, 250 or 550 g $NH_3$-nitrogen per ml as measured with an Orion ammonia electrode. The results are shown in FIG. 1. As shown, 2 grams readily scavenges about 100 g $NH_3$/ml from the solution.

Figure 2:
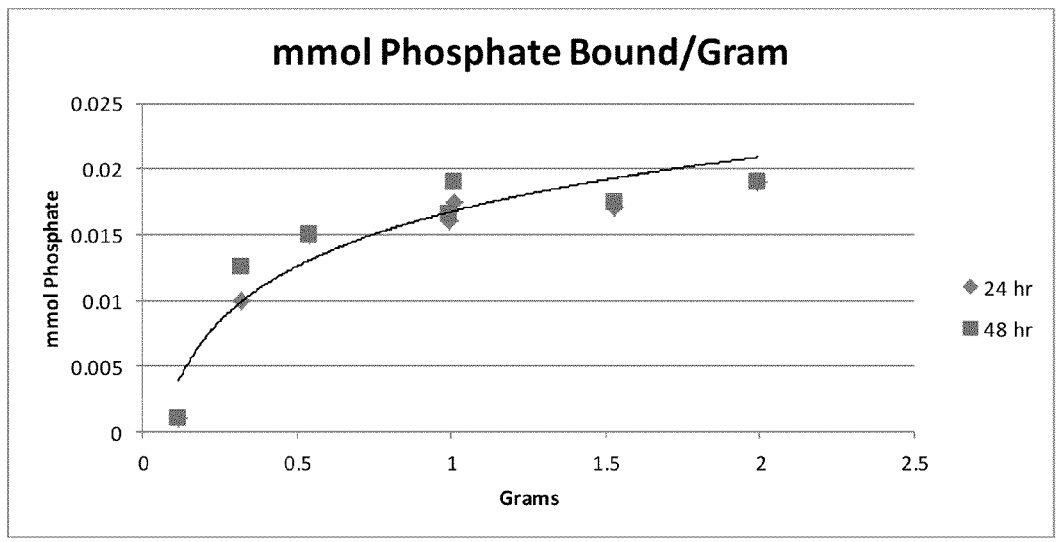
FIG. 2 shows the ability of the phosphorus binding component of the invention composite to bind phosphate.

Kinetics of Phosphorus Binding: Varying amounts of FeO(OH) were added to a 20 mL of a solution containing 20 mmol per Liter of phosphate. The resultant mixtures were mixed for 24 and 48 hours on a Nutator™ mixer. The phosphate was then measured. The results are shown in FIG. 2. The phosphate is removed over about 24 hours.

EXAMPLE 1

Bifunctional Activity

A sample of 100 mL of dairy lagoon wastewater containing 487 ppm ammonia nitrogen and 545 ppm of phosphorus as phosphate was analyzed after mixing with either 780 mg of zeolite, or 20 mg of FeO(OH) or 100 mg of a composite comprising 75% zeolite and 25% FeO(OH). The results are shown in Table 1.

TABLE 1

| Material | % Ammonium Removed | % Phosphate Removed |
|---|---|---|
| Zeolite | 92 | 0 |
| FeO(OH) | 0 | 25 |
| Composite | 87 | 16 |

The bifunctional zeolite-ferric composite removes both nitrogen and phosphorus. The lower removal of phosphate compared to ammonia by both the FeO(OH) and the composite is due to the slower binding of phosphate. It takes closer to 24 hours to effectively bind all of the phosphate, whereas ammonium is bound in less than 2 hours.

EXAMPLE 2

Total Kjeldahl Nitrogen and Phosphorous Removal

A sample of 500 mL of dairy lagoon wastewater containing 350 ppm ammonia nitrogen, 700 ppm of total Kjeldahl nitrogen and 62 ppm of phosphorus as phosphate was analyzed after mixing with either 1 g of the composite comprised of 80% zeolite and 20% FeO(OH). After one hour the liquid was centrifuged and the supernatant and the pellet after re-suspension were analyzed. The results are shown in Table 2.

TABLE 2

| Sample | Ammonium Nitrogen ppm | % Reduction | Total Kjeldahl Nitrogen* ppm | % Reduction | Total Phosphate ppm | % Reduction |
|---|---|---|---|---|---|---|
| Control** | 350 | — | 700 | — | 62 | — |
| Supernatant | 18 | 95 | 574 | 82 | 52 | 16 |
| Pellet | 77 | 80 | 378 | 46 | 53 | 14 |

*Includes solid forms of nitrogenous waste, insoluble organic nitrogen, ammonium, nitrates, nitrites, etc.
**Control = Untreated material prior to treatment by the invention.

EXAMPLE 3

Phosphorous Slow Release Over Time

Figure 3:
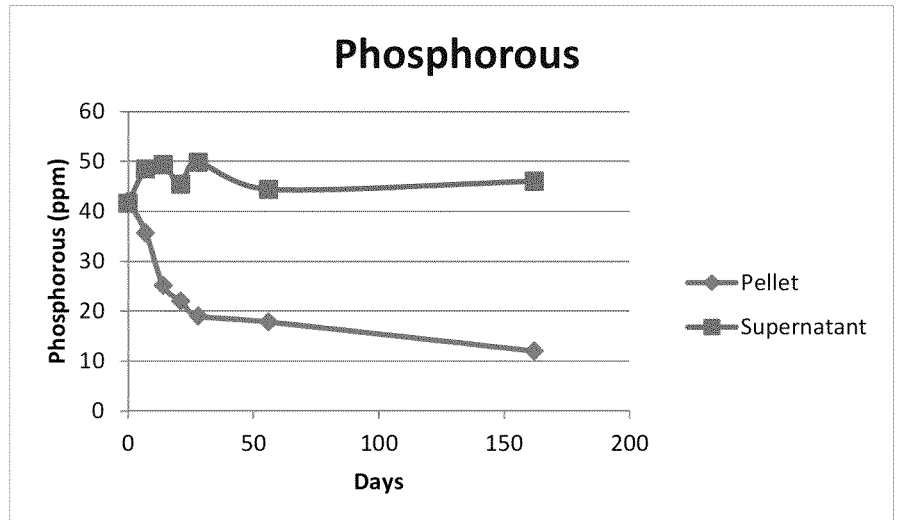
FIG. 3 shows the time dependent release of phosphorous from the composite of the invention.

A sample of dairy lagoon wastewater was divided into equal aliquots and each was treated with 2 grams of the composite per 500 mL of material. All samples were refrigerated. The original sample contained approximately 49.8 ppm phosphorous as phosphate. After mixing for 3 minutes, the first aliquot was centrifuged and the supernatant was sampled and tested for phosphorus. The pellet was suspended to 500 mL and tested for phosphorous. Subsequent samples were mixed for three minute and treated as above. The results are shown in Table 3 and shown graphically in FIG. 3.

TABLE 3

| Day | Pellet (P ppm) | Supernatant P (ppm) |
|---|---|---|
| 0 | 42.1 | 41.6 |
| 7 | 35.7 | 48.5 |
| 14 | 25.1 | 49.3 |
| 21 | 22 | 45.4 |
| 28 | 19 | 49.8 |
| 56 | 17.8 | 44.4 |
| 162 | 12 | 46 |

The supernatant remains relatively constant over time while the pellet decreases in concentration as the insoluble phosphorous compounds and those bound to the invention are made into "soluble" phosphorous compounds.

EXAMPLE 4

Ammonia Slow Release Over Time

Figure 4:
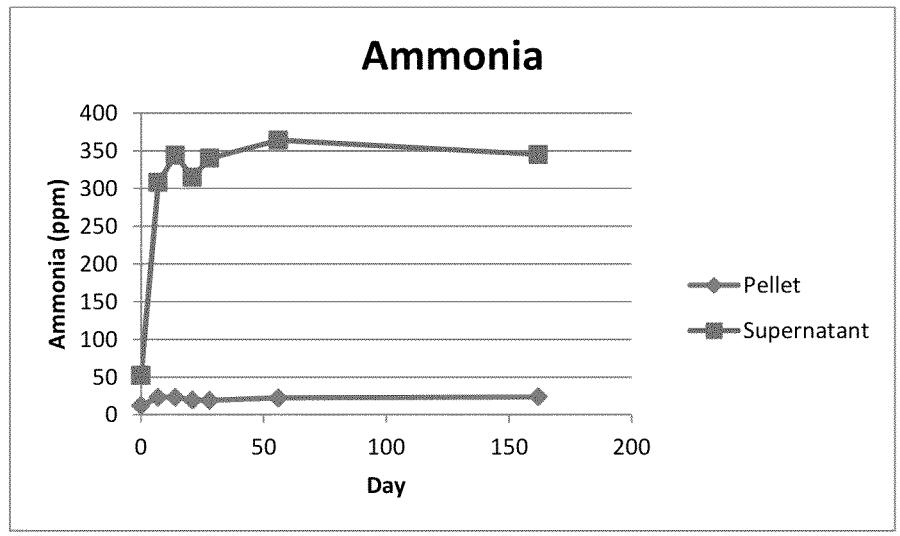
FIG. 4 shows the time dependent release of ammonia from the composite of the invention.

A sample of dairy lagoon wastewater was divided into equal aliquots and each was treated with 2 grams of the composite per 500 mL of material. All samples were refrigerated. The original sample contained approximately 240 ppm ammonia. After mixing for 3 minutes, the first aliquot was centrifuged and the supernatant was sampled and tested for ammonia. The pellet was suspended to 500 mL and tested for ammonia. Subsequent samples were mixed for three minute and treated as above. The results are shown in Table 4 and shown graphically in FIG. 4.

TABLE 4

| Ammonia | Pellet | Supernatant |
|---|---|---|
| 0 | 12 | 52 |
| 7 | 23 | 308 |
| 14 | 22.8 | 344 |
| 21 | 19.4 | 315 |
| 28 | 19 | 340 |
| 56 | 22.2 | 364 |
| 162 | 23.6 | 345 |

The supernatant initially increases and then is relatively constant over time due to ongoing ammonia release from the pellet. The pellet remains constant in concentration as the insoluble ammonia organic compounds and those bound to the composite are converted ammonia compounds.

The invention claimed is:

1. A granular, bifunctional amalgam that removes both ammonia and phosphate from an aqueous environment which amalgam comprises the sodium form of zeolite ZK406H® coupled to ferric ion through cation exchange with a ferric ion compound.

2. The amalgam of claim 1 which consists of said zeolite and ferric ion.

3. The amalgam of claim 1 wherein the ferric ion is derived from FeO(OH).

4. The amalgam of claim 2 wherein the ferric ion is derived from FeO(OH).

5. A method to remove ammonia and phosphate from an aqueous environment that contains ammonia and phosphate which method comprises contacting said environment with the amalgam of claim 1.

6. A method to remove ammonia and phosphate from an aqueous environment that contains ammonia and phosphate which method comprises contacting said environment with the amalgam of claim 2.

7. A method to remove ammonia and phosphate from an aqueous environment that contains ammonia and phosphate which method comprises contacting said environment with the amalgam of claim 3.

8. A method to remove ammonia and phosphate from an aqueous environment that contains ammonia and phosphate which method comprises contacting said environment with the amalgam of claim 4.

9. A solid precipitate obtained by the method of claim 5, that releases nitrogen and/or phosphorus in a continuous slow release.

10. A solid precipitate obtained by the method of claim 6, that releases nitrogen and/or phosphorus in a continuous slow release.

11. A solid precipitate obtained by the method of claim 7, that releases nitrogen and/or phosphorus in a continuous slow release.

12. A solid precipitate obtained by the method of claim 8, that releases nitrogen and/or phosphorus in a continuous slow release.

13. A method to fertilize a field which comprises adding the precipitate of claim 9 to said field.

14. A method to fertilize a field which comprises adding the precipitate of claim 10 to said field.

15. A method to fertilize a field which comprises adding the precipitate of claim 11 to said field.

16. A method to fertilize a field which comprises adding the precipitate of claim 12 to said field.

17. The method of claim 13 that results in increased herd capacity on a dairy farm.

18. The method of claim 14 that results in increased herd capacity on a dairy farm.

19. The method of claim 15 that results in increased herd capacity on a dairy farm.

20. The method of claim 16 that results in increased herd capacity on a dairy farm.

* * * * *